Patented Feb. 26, 1952

2,587,071

UNITED STATES PATENT OFFICE 2,587,071

PRODUCTION OF CALCIUM HYPOCHLORITE

Jerome W. Sprauer, Roslyn, Pa., assignor to The Pennsylvania Salt Manufacturing Company, Philadelphia, Pa., a corporation of Pennsylvania No Drawing. Application November 24, 1945, Serial No. 630,706

8 Claims. (Cl. 23—86)

This invention relates to the production of commercially pure calcium hypochlorite. This application is related in subject matter to my co-pending application 630,705, filed the same day as this application, now Patent 2,469,901.

The art of manufacture of calcium hypochlorite is old and well known. However, all previously known processes for producing neutral calcium hypochlorite suffer from the technological disadvantage of producing a difficultly filterable material which is hard to separate and wash. This has resulted in relatively costly methods of processing and in production of less pure materials than desirable. For example, in the well known chlorination of a concentrated aqueous suspension of hydrated lime, it has been found expedient, in order to obtain a suspension of better filterability, to chlorinate only incompletely to produce a suspension of mixed basic calcium hypochlorite and neutral calcium hypochlorite crystals, thus producing a final product which contains a relatively high proportion of hydroxide. Also, to obtain as complete a separation as possible of the desired calcium hypochlorite solids from the solution phase, which contains the undesired calcium chloride, resort has been had to the costly operation of hydraulic pressing. Chlorination of a concentrated aqueous mixture of hydrated lime and caustic soda, and similar process variations, were developed in an attempt to obviate the disadvantages concomitant to the relatively poor filterability of neutral calcium hypochlorite. In this process the solution phase of the final chlorinated suspension contains sodium chloride rather than calcium chloride; it was felt that sodium chloride was less objectionable and need not be separated so completely to produce the desired commercial product. In such processes the difficult filtration is frequently entirely omitted, the final chlorinated suspension or solution being dried as a whole. This method has the great disadvantage of producing a relatively less pure product containing only about fifty per cent calcium hypochlorite. Many other processes have been proposed and used to obviate the relatively difficult filtration (or centrifugation, pressing, or the like) of neutral calcium hypochlorite.

Several research workers have attempted to improve the filterability of neutral calcium hypochlorite with indifferent success. For example, Klopstock and Wurbs in U. S. Patent 2,007,429, proposed a process for precipitating neutral calcium hypochlorite of improved filterability by carrying out the precipitation in the presence of unusually large quantities of liquid obtained by recycling to the precipitation step waste solution from a previous precipitation and filtration. Kitchen U. S. Patent 1,937,230, claimed to produce neutral calcium hypochlorite of improved filterability by crystallizing basic calcium hypochlorite, separating these crystals, resuspending the separated basic calcium hypochlorite crystals in water and chlorinating. However, other workers have stated that with this method improvement in filterability was obtained only when the basic hypochlorite was separated in the form of well-formed hexagonal crystals of dibasic calcium hypochlorite. As will hereinafter be made apparent, these prior art workers were working along lines which did not disclose the combination of conditions necessary for producing a readily filterable product.

I have now discovered that in order to produce a crystal sludge of comparatively easily filterable crystals of neutral calcium hypochlorite by a process involving the "salting out" of this product from a solution highly concentrated, saturated or supersaturated with respect to neutral calcium hypochlorite, it is important to observe the following process conditions: (1) the salt should be added to the solution at a rapid rate, as hereinafter numerically defined, and (2) the solution should be substantially free of soluble sulfate, e. g. sulfate ion should be maintained below 0.3 parts by weight sulfate, calculated as $CaSO_4$, per 100 parts of Ca present, and preferably below 0.15 parts $CaSO_4$ per 100 parts of Ca. It is also important that the process should be carried out at a temperature below about 30° C. preferably in the range of about 10° to 25° C.

The above process conditions in combination, I have found, have a most favorable effect on whatever factors are responsible for ease of filtration of a calcium hypochlorite crystal slurry. It is difficult to set up an objective criterion of filterability since ease of filtration depends upon the apparatus used, the manner in which the filtration is performed and many other factors. In whatever manner the comparison is made, however, the crystal sludge produced by following the conditions of my invention as above set forth, will show remarkably improved filterability over a product made by prior art methods.

In this connection it may be noted that in the prior art any reference to the effect of crystal size has recognized only the desirability of producing large crystals in order to obtain good filterability whereas my studies indicate that the range of size distribution is also important. That is, crystals which fall into a comparatively narrow range of size distribution may show superior filterability to crystals of a wide size distribution even though the average crystal size is larger in the latter case.

Maintaining the conditions of my invention as above outlined results generally in the production of a large average size of crystal. What appears to be even more important, however, is the fact that the crystals formed substantially all fall within a narrow size distribution range. Although I do not wish to be limited to any theoretical explanation of the mechanism of my process, it is this production of uniformly sized as well as large average sized crystals that I believe accounts in great part for the easy filterability of sludges of neutral calcium hypochlorite made in accordance with my invention. Moreover, maintaining the conditions of my invention as above outlined results consistently in the production of well-formed, tetragonal crystals as compared to the usually rough and irregular crystal shapes of the prior art, and this may contribute importantly to the superior filterability of sludges of neutral calcium hypochlorite made in accordance with my invention. However, the important fact is that maintenance of the process conditions above outlined results in production of an easily filterable crystal sludge.

It is particularly surprising that a rapid rate of addition of the salt causing precipitation of the neutral calcium hypochlorite should have this result since such operation, tending as it does to increase the rate of crystallization, would be expected to favor the formation of a fine crystal mass. Notwithstanding these views of the prior art I have found, as above pointed out, that the rapid addition of salt is an important condition in obtaining easily filterable crystals. The fact that crystal size should be so adversely affected by even extremely minor quantities of sulfate ion, i. e. such minor quantities as just above 0.3 parts by weight calcium sulfate per 100 parts by weight calcium, is also remarkable, since there is no reason for a chemist to have expected sensitivity to sulfate ion in this crystallization process.

In a preferred method of carrying out the process of my invention a suitable salt reagent for salting out neutral calcium hypochlorite, for example sodium chloride or other reasonably soluble salt which does not react deleteriously with calcium ions or hypochlorite ions or introduce undesirable impurities (e. g. alkali metal salts such as potassium chloride, sodium chlorate, etc.) is added to a solution containing calcium ions and hypochlorite ions. Preferably said solution containing calcium ions and hypochlorite ions will not contain substantially more than three equivalents of chloride ion per equivalent of hypochlorite ion, most advantageously not more than about one equivalent chloride ion per equivalent of hypochlorite ion. Such solutions may be prepared by substantially complete chlorination of a water suspension of hydrated lime, $Ca(OH)_2$, preferably of initial concentration of about 17% to 20% $Ca(OH)_2$, or of a water suspension of basic calcium hypochlorite prepared by known methods, preferably of such concentration that the resulting solution is saturated or moderately supersaturated with respect to neutral calcium hypochlorite. Optimum results are obtained when the solution containing calcium ions and hypochlorite ions is supersaturated with respect to neutral calcium hypochlorite, and sodium chloride is added with minimum delay after the solution is brought to supersaturation and before appreciable spontaneous crystallization occurs. A product of highest purity will be obtained by filtering the solution just prior to salt addition.

Solutions containing calcium ion and hypochlorite ion may also be made up employing sodium hypochlorite to furnish hypochlorite ion and lime or other soluble or partially soluble calcium compound to furnish the calcium ion, and reducing the alkalinity of the resulting solution if necessary, e. g. by chlorination. In order to obtain a yield upon addition of a salt such as sodium chloride, the solution should be highly concentrated, saturated, or supersaturated, preferably supersaturated, with respect to neutral calcium hypochlorite, and should contain the minimum practical concentration of other electrolytes such as sodium chloride or calcium chloride. In any case, upon addition of the salt in the process of my invention the solution becomes highly concentrated with respect to the added soluble salt such as sodium choride, and has passed the saturation point with respect to a neutral calcium hypochlorite, thus precipitating this material. My studies indicate that it is probably a hydrate of approximate formula $Ca(OCl)_2 \cdot 2.5H_2O$ that precipitates.

The rate of salt addition which, as above pointed out, is an important condition in carrying out the process of my invention, should be such that all salt is added within a period of about 60 minutes, preferably as rapidly as possible within 30 minutes or less. Addition of the salt within 60 minutes means, of course, that an average of 1.66% of the salt requirement is added per minute, while addition of the salt within 30 minutes means that an average of 3.33% of the salt requirement is added per minute. As above pointed out, salt addition is started before appreciable spontaneous crystallization occurs. When the solution containing calcium ions and hypochlorite ions to which salt is added is supersaturated prior to salt addition, the initial crystallization will occur shortly after salt addition, for example, within about thirty minutes; when said solution is undersaturated prior to salt addition, several hours may be required for initial crystallization.

Suitable precautions are taken to bring the sulfate ion content of the solution from which neutral calcium hypochlorite is precipitated, as above described, to the low value indicated. This may advantageously be done by adding an amount of barium ion, for example as barium chloride, adequate to precipitate the sulfate ion. The barium sulfate thus precipitated may be left in the mixture since it is generally quite small in amount and does not furnish enough sulfate ion to affect the crystallization.

As above pointed out, the temperature during salting out is maintained below about 30° C. preferably below 25° C. A temperature in the range of about 10 to 25° C. has been found to be most advantageous.

The crystallization process of my invention may be varied in a number of respects without departing from the conditions defining my invention as above set forth. Thus to the solution or suspension highly concentrated or saturated with respect to the desired neutral calcium hypochlorite product, a small quantity of pre-formed crystals may be added. The amount of such added crystals need be no more than 10 to 15 per cent of the final crystal crop. Although this variant of my process may sometimes be desirable, it is not essential for the production of readily filterable crystals so long as the process conditions outlined above are maintained.

The following examples are illustrative of the process of my invention:

Example 1

A water suspension of lime containing about 17.5% Ca(OH)$_2$ and added barium chloride in excess of the sulfate content of the suspension was chlorinated to about 98% completion and filtered to yield a solution containing 18.0 grams Ca(OCl)$_2$/14.6 grams CaCl$_2$/100 grams H$_2$O.

To a portion of this solution at about 20° C. was added sodium chloride substantially free from sulfate over a period of about fifteen minutes in the proportion of about 12 parts by weight of NaCl per 100 parts by weight of solution. Well-formed crystals of neutral calcium hypochlorite were formed consisting principally of single and aggregate crystals in the 15–30 micron size range.

Example 2

Another portion of the Example 1 solution containing 18.0 grams Ca(OCl)$_2$/14.6 grams CaCl$_2$/100 grams H$_2$O was mixed with the final suspension of Example 1 in the proportion of about 0.10 part by weight of Ca in the final Example 1 suspension per part by weight Ca in the solution. To the resulting suspension at 25° C. was added sodium chloride substantially free from sulphate over a period of about 25 minutes in the proportion of about 11 parts by weight of NaCl per 100 parts by weight of suspension. Well-formed, easily filterable crystals of neutral calcium hypochlorite were formed with negligible proportions below 50 microns.

Example 3

A filter cake consisting substantially of dibasic calcium hypochlorite prepared by known methods containing 31% Ca(OCl)$_2$, 31% Ca(OH)$_2$, and 5% CaCl$_2$ was mixed with 210 parts by weight of water per 100 parts by weight of filter cake, barium chloride was added in excess of the sulfate content, and the resulting slurry was chlorinated to 0.5% Ca(OH)$_2$ content. The resulting solution was immediately filtered and cooled to 15° C. and about 0.01 parts by weight BaCl$_2$ per 100 parts by weight of solutions were added. About 13.7 parts by weight of NaCl substantially free from sulfate per 100 parts by weight of solution were then added in about five minutes. A crystal suspension of neutral calcium hypochlorite of exceptionally good filterability resulted.

The above description of the process of my invention is to be interpreted as illustrative only and my invention is not limited except as set forth in the claims which follow.

I claim:

1. In a process for precipitation of neutral calcium hypochlorite by salting out this material from a solution containing calcium and hypochlorite ions, the improvement which comprises substantially completing the addition of the salt within a period of about 60 minutes, maintaining said solution substantially free from soluble sulfate, and carrying out the precipitation at a temperature below about 30° C.

2. In a process for precipitation of neutral calcium hypochlorite by addition of sodium chloride to a solution containing calcium and hypochlorite ions, the improvement which comprises substantially completing the addition of the sodium chloride within a period of about 60 minutes, maintaining said solution substantially free from soluble sulfate, and carrying out the precipitation at a temperature below about 30° C.

3. In a process for precipitation of neutral calcium hypochlorite by salting out this material from a solution at least saturated with respect to neutral calcium hypochlorite and containing not substantially more than one equivalent of chloride ion per equivalent of hypochlorite ion, the improvement which comprises substantially completing the addition of the salt within a period of about 60 minutes, maintaining soluble sulfate in said solution below about 0.3 parts by weight, calculated as CaSO$_4$, per 100 parts of calcium present, and carrying out the precipitation at a temperature below about 30° C.

4. In a process for precipitation of neutral calcium hypochlorite by addition of sodium chloride to a solution at least saturated with respect to neutral calcium hypochlorite and containing not substantially more than one equivalent of chloride ion per equivalent of hypochlorite ion, the improvement which comprises substantially completing the addition of the sodium chloride within a period of about 30 minutes, maintaining soluble sulfate in said solution below about 0.3 parts by weight, calculated as CaSO$_4$, per 100 parts of calcium, and carrying out the precipitation at a temperature below about 30° C.

5. In a process for precipitation of neutral calcium hypochlorite by addition of sodium chloride to a solution supersaturated with respect to neutral calcium hypochlorite and containing not substantially more than one equivalent of chloride ion per equivalent of hypochlorite ion, the improvement which comprises substantially completing the addition of the sodium chloride within a period of about 30 minutes, maintaining soluble sulfate in said solution below about 0.15 parts by weight, calculated as CaSO$_4$, per 100 parts of calcium, and carrying out the precipitation at a temperature in the range of about 10 to 25° C.

6. A process for production of neutral calcium hypochlorite which comprises substantially completely chlorinating a water suspension of hydrated lime containing about 17 to 20% by weight Ca(OH)$_2$, adding sodium chloride to the resulting solution within a period of about 30 minutes to precipitate neutral calcium hypochlorite therefrom, maintaining said solution substantially free from soluble sulfate during said precipitation, and carrying out the precipitation at a temperature below about 30° C.

7. A process for production of neutral calcium hypochlorite which comprises substantially completely chlorinating a water suspension of basic calcium hypochlorite of such concentration that the resulting solution is at least saturated with respect to neutral calcium hypochlorite, adding sodium chloride to the resulting solution within a period of about 30 minutes to precipitate neutral calcium hypochlorite therefrom, maintaining said solution substantially free from soluble sulfate during said precipitation, and carrying out the precipitation at a temperature below about 30° C.

8. In a process for precipitation of neutral calcium hypochlorite by salting out this material from a solution containing calcium and hypochlorite ions, the improvement which comprises adding the salt at an average rate of 3.33% of the salt requirement per minute, maintaining said solution substantially free from soluble sulfate, and carrying out the precipitation at a temperature below about 30° C.

JEROME W. SPRAUER.

REFERENCES CITED

The following references are of record in the file of this patent:

UNITED STATES PATENTS

| Number | Name | Date |
| --- | --- | --- |
| 1,754,473 | MacMullin et al. | Apr. 15, 1930 |
| 1,937,230 | Kitchen | Nov. 28, 1933 |
| 2,007,429 | Klopstock | July 9, 1935 |
| 2,320,635 | Mericola et al. | June 1, 1943 |
| 2,368,042 | Robson | Jan. 23, 1945 |

FOREIGN PATENTS

| Number | Country | Date |
| --- | --- | --- |
| 487,009 | Great Britain | June 14, 1938 |